United States Patent
Hayashi

(10) Patent No.: US 10,175,466 B2
(45) Date of Patent: Jan. 8, 2019

(54) SHEET ILLUMINATION MICROSCOPE SYSTEM, IMAGE PROCESSING DEVICE AND SHEET ILLUMINATION MICROSCOPY

(71) Applicant: OLYMPUS CORPORATION, Hachioji-shi, Tokyo (JP)

(72) Inventor: Shinichi Hayashi, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 327 days.

(21) Appl. No.: 15/242,436

(22) Filed: Aug. 19, 2016

(65) Prior Publication Data

US 2017/0068083 A1  Mar. 9, 2017

(30) Foreign Application Priority Data

Sep. 7, 2015  (JP) ................. 2015-176183

(51) Int. Cl.
| | |
|---|---|
| *H04N 13/00* | (2018.01) |
| *G02B 21/08* | (2006.01) |
| *G02B 21/36* | (2006.01) |
| *G02B 21/16* | (2006.01) |

(52) U.S. Cl.
CPC ............ *G02B 21/08* (2013.01); *G02B 21/16* (2013.01); *G02B 21/367* (2013.01)

(58) Field of Classification Search
None
See application file for complete search history.

(56) References Cited

U.S. PATENT DOCUMENTS

| | | | |
|---|---|---|---|
| 2006/0033987 A1* | 2/2006 | Stelzer | G02B 21/06 359/385 |
| 2007/0109633 A1 | 5/2007 | Stelzer | |
| 2009/0225413 A1 | 9/2009 | Stelzer et al. | |
| 2012/0098949 A1* | 4/2012 | Knebel | G02B 21/002 348/79 |
| 2012/0099190 A1 | 4/2012 | Knebel et al. | |
| 2014/0042339 A1 | 2/2014 | Stelzer et al. | |
| 2015/0309294 A1 | 10/2015 | Stelzer | |
| 2015/0338628 A1 | 11/2015 | Knebel et al. | |

FOREIGN PATENT DOCUMENTS

| | | |
|---|---|---|
| CN | 104407436 A | 3/2015 |
| DE | 102010060121 A1 | 4/2012 |
| JP | 2006509246 A | 3/2006 |
| JP | 2012108491 A | 6/2012 |
| WO | 2004053558 A1 | 6/2004 |

* cited by examiner

*Primary Examiner* — Kaitlin A Retallick
(74) *Attorney, Agent, or Firm* — Holtz, Holtz & Volek PC

(57) ABSTRACT

An image processing device includes a spatial frequency filtering process unit. The spatial frequency filtering process unit performs a spatial frequency filtering process on image data of a three-dimensional image of the observed object in accordance with the optical transfer characteristic of the microscope apparatus. The spatial frequency filtering process is a process of changing a spatial frequency characteristic included in the three-dimensional image. The three-dimensional image is constructed from a plurality of two-dimensional images of the observed object acquired by the microscope apparatus under a first illumination light amount distribution. The first illumination light amount distribution is formed by moving a condensing position of a light sheet in an illumination direction. The light sheet is emitted to the observed object from the illumination direction.

11 Claims, 16 Drawing Sheets

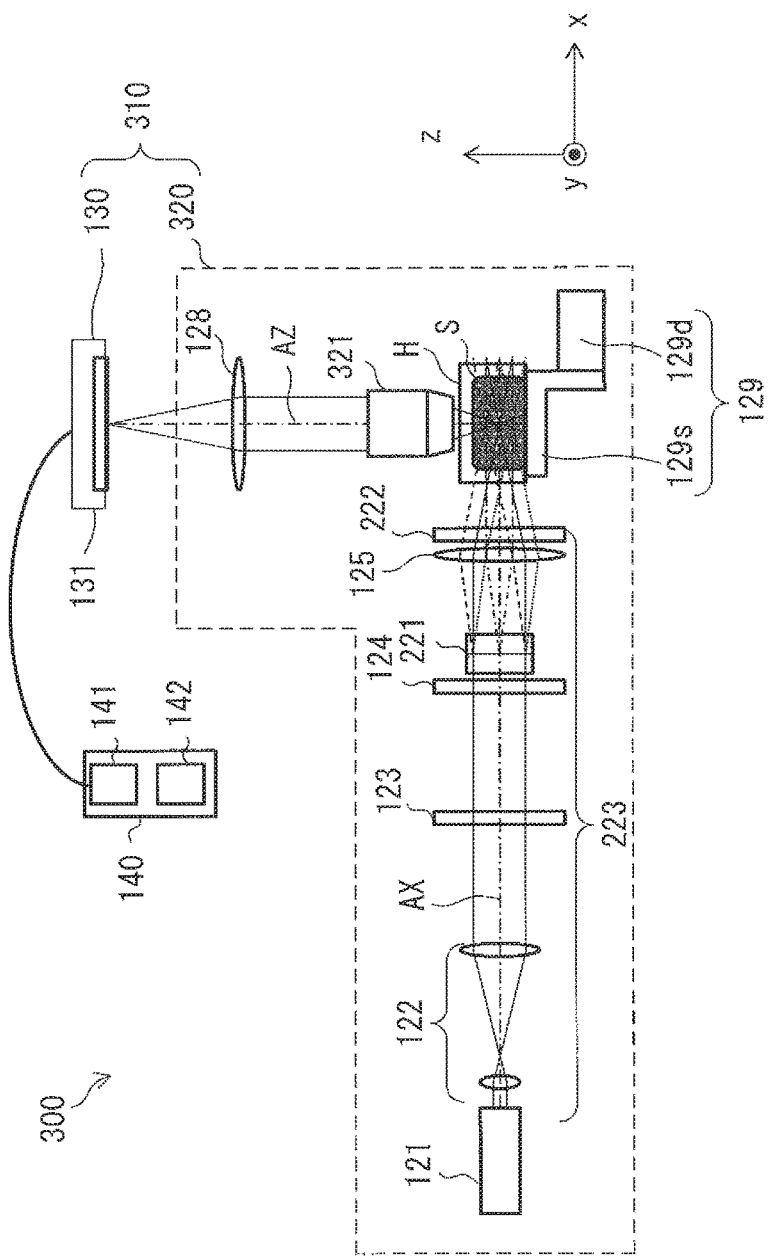
F I G. 9 A

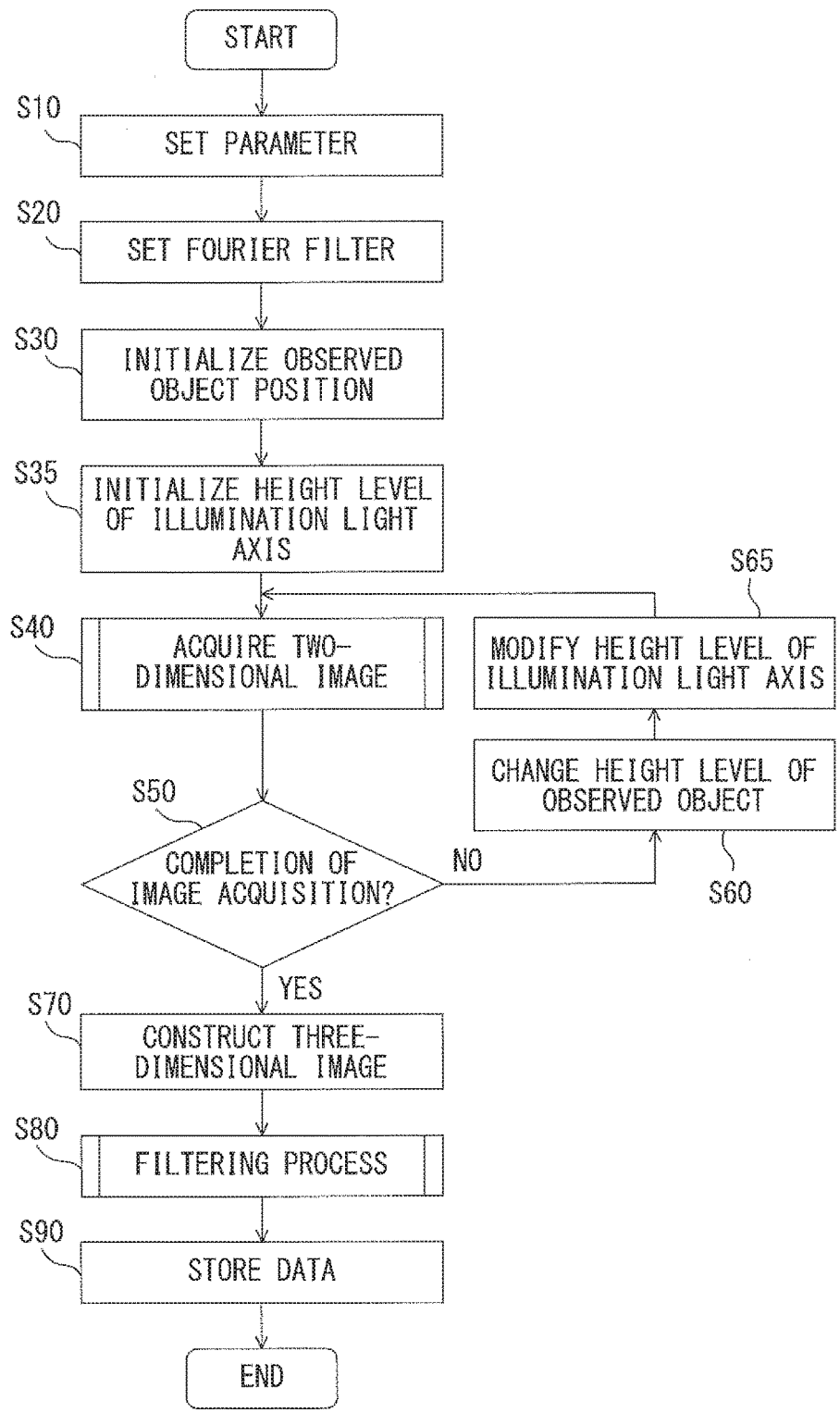
F I G. 10

SHEET ILLUMINATION MICROSCOPE SYSTEM, IMAGE PROCESSING DEVICE AND SHEET ILLUMINATION MICROSCOPY

CROSS REFERENCE TO RELATED APPLICATIONS

This application is based upon and claims the benefit of priority from prior Japanese Patent Application No. 2015-176183, filed Sep. 7, 2015, the entire contents of which are incorporated herein by this reference.

BACKGROUND OF THE INVENTION

Field of the Invention

The present invention relates to techniques of a sheet illumination microscope system, an image processing device and sheet illumination microscopy.

Description of the Related Art

In the field of fluorescence microscopes, a sheet illumination light technique is known in which the observed object is irradiated with illumination light from a direction (x axis direction) orthogonal to the optical axis of the detection optical system (z axis) so that light in the form of a sheet (referred to as a light sheet hereinafter) that is roughly orthogonal to the optical axis of the detection optical system is formed in the observed object. This technique has advantages including reduced damage to the observed object, realization of high resolving power in the z axis direction, etc., and has been attracting attention in recent years.

Japanese National Publication of International Patent Application No. 2006-509246, Japanese Laid-open Patent Publication No. 2012-108491, and Chinese Laid-open Patent Publication No. 104407436 disclose a sheet illumination microscope that utilizes a sheet illumination light technique.

SUMMARY OF THE INVENTION

An aspect of the present invention provides a sheet illumination microscope system including a microscope apparatus configured to acquire a two-dimensional image of an observed object under a first illumination light amount distribution, and an image processing device configured to perform a spatial frequency filtering process on image data of a three-dimensional image of the observed object in accordance with an optical transfer characteristic of the microscope apparatus. The first illumination light amount distribution is formed by moving a condensing position of a light sheet in an illumination direction orthogonal to an observation direction. The light sheet is emitted to the observed object from the illumination direction. The spatial frequency filtering process is a process of changing a spatial frequency characteristic included in the three-dimensional image. The three-dimensional image is constructed from a plurality of two-dimensional images acquired by the microscope apparatus.

Another aspect of the present invention provides an image processing device including a spatial frequency filtering process unit configured to perform a spatial frequency filtering process on image data of a three-dimensional image of an observed object in accordance with an optical transfer characteristic of an microscope apparatus. The spatial frequency filtering process is a process of changing a spatial frequency characteristic included in the three-dimensional image. The three-dimensional image is constructed from a plurality of two-dimensional images of the observed object acquired by the microscope apparatus under a first illumination light amount distribution. The first illumination light amount distribution is formed by moving a condensing position of a light sheet in an illumination direction orthogonal to an observation direction. The light sheet is emitted to the observed object from the illumination direction.

A still another aspect of the present invention is a sheet illumination microscopy including acquiring, by a microscope, a two-dimensional image of an observed object under a first illumination light amount distribution, moving a condensing position of a light sheet based on the observed object in an observation direction, constructing image data of a three-dimensional image of the observed object from a plurality of two-dimensional images, and performing a spatial frequency filtering process on the image data of the three-dimensional image and in accordance with an optical transfer characteristic of the microscope apparatus. The first illumination light amount distribution is formed by moving the condensing position of the light sheet in an illumination direction orthogonal to the observation direction. The light sheet is emitted to the observed object from the illumination direction. The plurality of two-dimensional images is acquired by repeating the acquisition of the two-dimensional images and the movement in the observation direction. The spatial frequency filtering process is a process of changing a spatial frequency characteristic included in the three-dimensional image.

BRIEF DESCRIPTION OF THE DRAWINGS

The present invention will be more apparent from the following detailed description when the accompanying drawings are referenced.

FIG. 9A is an x-z sectional view showing a configuration of a sheet illumination microscope system 300 according to example 3;

FIG. 10 is a flowchart showing the flow of the process performed by the sheet illumination microscope system 300.

DESCRIPTION OF THE EMBODIMENTS

According to a conventional sheet illumination microscope, the resolving power in the z axis direction (referred to as z resolving power hereinafter) depends upon the thickness in the z axis direction of a light sheet (referred to as the thickness of the light sheet hereinafter), and the smaller the thickness of the light sheet is, the higher the z resolving power is. The thickness of a light sheet becomes smaller with an increasing numerical aperture on the exit side of the illumination optical system. Therefore, it is desirable that an illumination optical system have a high numerical aperture in order to achieve high z resolving power. Meanwhile, when an illumination optical system has a high numerical aperture, the illuminated area in which a light sheet is formed becomes narrow in the illumination light direction (x axis direction).

Thus, observation over a wide field-of-view at high z resolving power by using a conventional sheet illumination microscope such as one disclosed by Japanese National Publication of International Patent Application No. 2006-509246 and Japanese Laid-open Patent Publication No. 2012-108491 requires many times of repeating of the process of moving the condensing position of the light sheet in the illumination direction in the field-of-view so as to thereafter acquire an image. Such a case results in a great number of acquired images, also resulting in a longer time for acquiring images. Also, the observed object is illuminated for a longer time, accelerating the photobleaching and increasing influence of a phototoxic property.

The sheet illumination microscope disclosed by Chinese Laid-open Patent Publication No. 104407436 is a two-photon excitation fluorescence microscope, and is capable of expanding the illuminated area in the illumination direction by moving the condensing position of a light sheet at a high speed. However, the sheet illumination microscope disclosed by Chinese Laid-open Patent Publication No. 104407436 moves the condensing position of a light sheet during the exposure period, resulting in a z-axis directional expansion of the illumination light amount distribution, which is generated during the exposure period. Thus, it is difficult to achieve high z resolving power when the sheet illumination microscope disclosed by Chinese Laid-open Patent Publication No. 104407436 is applied to a one-photon excitation fluorescence microscope.

With the above situation taken into consideration, specific explanations will be given for the embodiments of the present invention below.

Figure 1A:
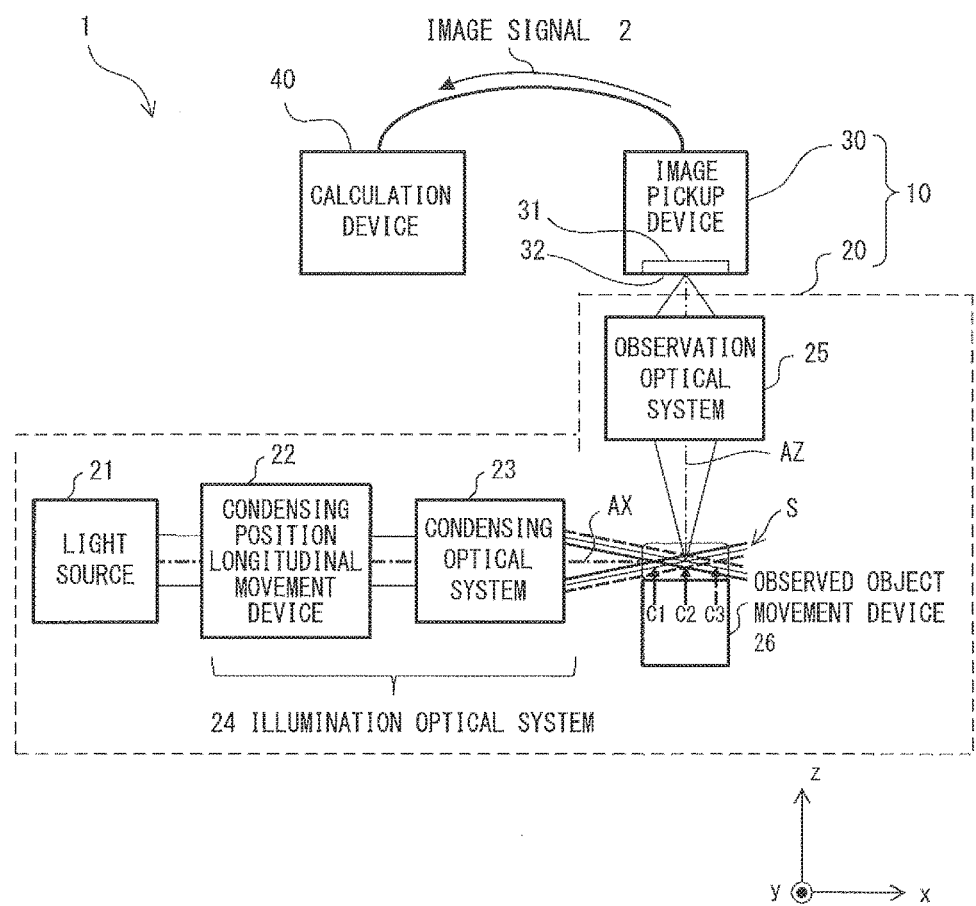
FIG. 1A shows a configuration of a sheet illumination microscope system 1 according to an embodiment.
Figure 1B:
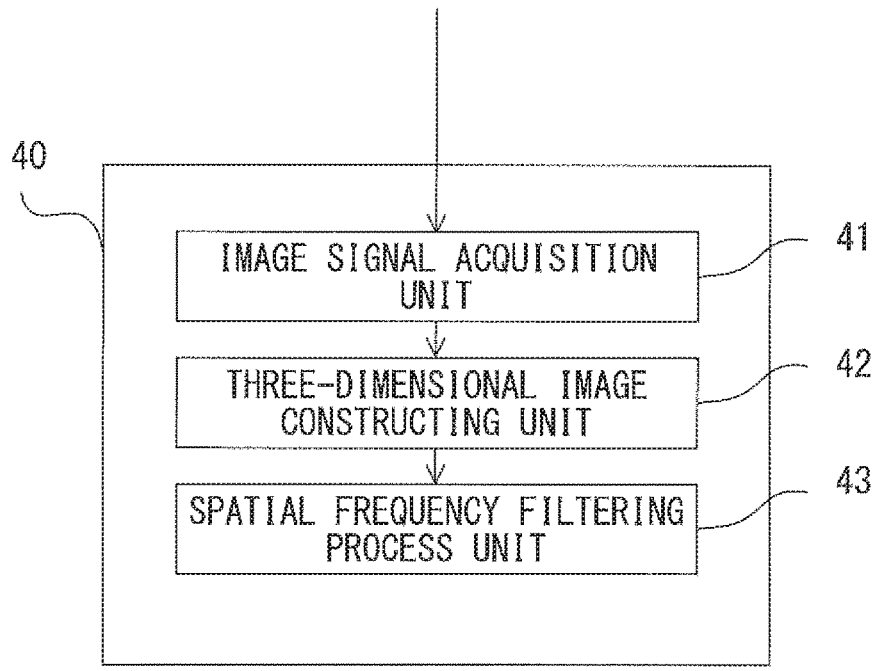
FIG. 1B shows a configuration of a calculation device 40 according to an embodiment.

FIG. 1A shows a configuration of a sheet illumination microscope system 1 according to an embodiment of the present invention. FIG. 1B shows a configuration of a calculation device 40 shown in FIG. 1A. The xyz coordinate system shown in FIG. 1A is an orthogonal coordinate system defined for convenience of the reference for directions in the specification. The x axis direction is an illumination direction in which the illumination light travels. The z axis direction is an observation direction in which observed object S is observed. The Y axis direction is a direction orthogonal to both the illumination direction and the observation direction.

The sheet illumination microscope system 1 includes a sheet illumination microscope apparatus 10 that emits a light sheet to observed object S so as to acquire a two-dimensional image and the calculation device 40 that conducts various calculations on the basis of an image signal 2 output from the sheet illumination microscope apparatus 10.

Note that a light sheet refers to light in the form of a thin sheet in one of the two directions that are orthogonal to the light traveling direction. Of the two directions orthogonal to the light traveling directions, the direction with the smaller diameter of the flux constituting the light sheet is referred to as the thickness direction and the direction with the greater diameter is referred to as the width direction. In the sheet illumination microscope system 1, the z axis direction is the thickness direction and the y direction is the width direction. The condensing position of a light sheet refers to the position at which the flux diameter becomes the smallest with respect to the thickness direction. The height level of observed object S refers to a distance from a certain reference position to observed object S with respect to the observation direction.

The sheet illumination microscope apparatus 10 is a fluorescence microscope that acquires a two-dimensional image (fluorescence image) of observed object S, and is for example a one-photon excitation fluorescence microscope. The sheet illumination microscope apparatus 10 includes a microscope body 20 that forms a two-dimensional image of observed object S on an image pickup plane 32 of an image pickup element 31, and an image pickup device 30 that has the image pickup element 31 and acquires a two-dimensional image of observed object S.

The microscope body 20 includes a light source 21 that emits illumination light and an illumination optical system 24 that forms a light sheet in observed object S from the illumination light emitted from the light source 21. The microscope body 20 further includes an observation optical system 25 that projects a two-dimensional image of observed object S onto the image pickup plane 32, and an observed object movement device 26 that changes the height level of observed object S by moving observed object S in the observation direction.

The light source 21 is for example a lamp light source such as a mercury lamp, a xenon lamp, etc., a laser beam source or an LED (light emitting diode). The illumination optical system 24 emits a thin light sheet in the observation direction to observed object S from the illumination direction (x axis direction) that is orthogonal to the observation direction (z axis direction). The illumination optical system 24 includes a condensing position longitudinal movement device 22 that moves the condensing position of a light sheet in the illumination direction and a condensing optical system 23 that condenses a light sheet at least in the observation direction. FIG. 1A shows a situation in which the condensing position of alight sheet is changed by the condensing position longitudinal movement device 22 to different condensing positions C1, C2 and C3.

The observation optical system 25 is configured so that the optical axis AZ of the observation optical system 25 is orthogonal to the optical axis AX of the illumination optical system 24 and the front-side focal plane of the observation optical system 25 is located on or near the optical axis AX of the illumination optical system 24. Thereby, an image in the area in which a light sheet in the observed object S is formed can be projected onto the image pickup plane 32.

The observed object movement device 26 includes for example a stage on which observed object S is set and a drive device that moves the stage in the observation direction. By the observed object movement device 26 moving observed object S, images of different areas in observed object S can be projected onto the image pickup plane 32 without changing the positional relationship between the focal plane of the observation optical system 25 and a light sheet formed by the illumination optical system 24.

The image pickup device 30 is for example a CCD (Charge-Coupled Device) camera or a CMOS (Complementary MOS) camera, and outputs to the calculation device 40 a digital image signal (image signal 2) related to a two-dimensional image of observed object S. The image pickup element 31 is a two-dimensional image sensor such as a CCD image sensor or a CMOS image sensor. The image pickup device 30 is arranges so that the image pickup plane 32 is substantially orthogonal to the optical axis AZ of the observation optical system 25. It is desirable that the image pickup plane 32 be on a plane conjugated with the front-side focal plane of the observation optical system 25.

The calculation device 40 is an image processing device that processes an image acquired by the sheet illumination microscope apparatus 10, and is for example a personal computer or a computer dedicated to image processing. As shown in FIG. 1B, the calculation device 40 includes an image signal acquisition unit 41, a three-dimensional-image constructing unit 42 and a spatial frequency filtering process unit 43.

The image signal acquisition unit 41 acquires an image signal 2 of a two-dimensional image from the image pickup device 30. The three-dimensional-image constructing unit 42 constructs a three-dimensional image of observed object S on the basis of the image signal 2 acquired by the image signal acquisition unit 41. This three-dimensional image includes a plurality of two-dimensional images acquired by the image pickup device 30. The spatial frequency filtering process unit 43 performs, on image data of a three-dimensional image constructed by the three-dimensional-image constructing unit 42, a spatial frequency filtering process in which the spatial frequency characteristic of the three-dimensional image is changed in accordance with the optical transfer characteristic of the sheet illumination microscope apparatus 10.

Note that an optical transfer characteristic refers to a characteristic that represents a degree to which information is transferred optically. The optical transfer characteristic of an optical system is an imaging characteristic of that optical system, and a representative example thereof is a point spread function (PSF), optical transfer function (OTF), etc. The optical transfer characteristic of a microscope apparatus is a characteristic based on the consideration of illumination conducted by the microscope apparatus, and is determined by the optical transfer characteristic of the observation optical system included in that microscope apparatus and the illumination state (i.e., the illumination light amount distribution during the exposure period). For example, the optical transfer characteristic of a microscope apparatus in a certain illumination state is an optical transfer characteristic that is determined by the optical transfer characteristic of the observation optical system and its illumination state. The spatial frequency characteristic of an image is a distribution state of spatial frequency components included in that image. Changing a spatial frequency characteristic refers to changing a distribution state of the spatial frequency components.

Figure 2A:
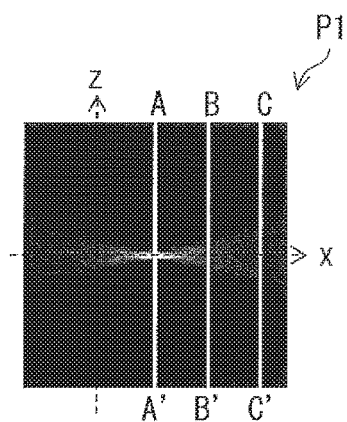
FIG. 2A shows illumination intensity distributions in grayscale in a case when the condensing position of a light sheet is fixed.
Figure 2B:
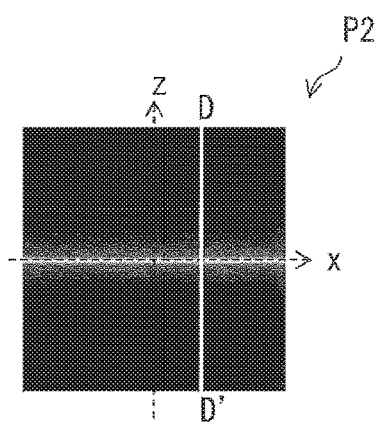
FIG. 2B shows illumination intensity distributions in grayscale in a case when the condensing position of a light sheet has moved to a plurality of positions.
Figure 2C:
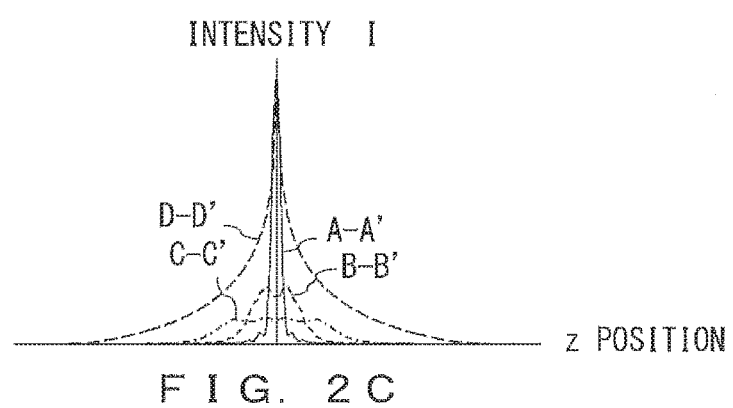
FIG. 2C shows illumination intensity distributions on respective sections of FIG. 2A and FIG. 2B.

FIG. 2A shows illumination intensity distributions in grayscale, the illumination intensity distributions being formed in observed object S when the condensing position of a light sheet is fixed. FIG. 2B shows illumination intensity distributions in grayscale, the illumination intensity distributions being formed in observed object S when the condensing position of a light sheet has moved to a plurality of positions. FIG. 2C shows illumination intensity distributions on respective sections of FIG. 2A and FIG. 2B (sections A-A', B-B', C-C' and D-D'). Hereinbelow, by referring to FIG. 2A through FIG. 2C, explanations will be given for differences of illumination intensity distributions caused between when the condensing position of a light sheet is fixed and when the condensing position is moved. Note that an illumination intensity distribution refers to a distribution of an average illumination light amount per unit time during a certain period, and refers in this specification to an average illumination light amount distribution during an exposure period. In FIG. 2A and FIG. 2B, the brighter (whiter) a region is, the greater the intensity in that region is.

When the condensing position of alight sheet is fixed, the light sheet becomes wider in the observation direction (z axis direction) with an increasing distance from the condensing position as shown as image P1 of FIG. 2A. This leads to a situation where the sectional plane intensity distribution in the observation direction has the highest and steep peak at the condensing position (section A-A') as shown in FIG. 2C. Also, in the sectional plane intensity distribution in the observation direction, with an increasing distance from the condensing position (sections B-B' and C-C'), the peaks becomes lower and the intensity distribution becomes wider. Accordingly, under the illumination with a fixed condensing position of a light sheet, an area having an illumination intensity that is sufficient for exciting a fluorescence substance and that is roughly uniform in the illumination direction (x axis direction) (referred to as an illuminated area hereinafter) exists only near the condensing position. Also, the length of the illuminated area in the illumination direction depends upon the numerical aperture on the exit side of the illumination optical system in which a light sheet is formed, and become shorter with an increasing numerical aperture.

Meanwhile, when the condensing position of a light sheet moves in the illumination direction, the sectional plane intensity distribution in the observation direction is acquired by integrating the sectional plane intensity distributions at a plurality of condensing positions that are different in the illumination direction. Accordingly, the sectional plane intensity distributions in the observation direction are averaged uniformly in the illumination direction. Thus, these distributions have roughly the same shape regardless of the sectional plane (position in the illumination direction). This forms an illuminated area in a wide area in the illumination direction. However, as shown in FIG. 2C, the sectional plane intensity distribution in each section (section D-D') becomes wider than in a case of a fixed condensing position of a light sheet.

In the sheet illumination microscope system 1, the condensing position of a light sheet is moved in the illumination direction by the condensing position longitudinal movement device 22 during the exposure period of the image pickup device 30, and accordingly the illuminated scope expands in the illumination direction. This makes it possible, even with a high numerical aperture for the illumination optical system 24, to observe a wide field-of-view with a number of acquired images smaller than in a case of a fixed condensing position of a light sheet.

By contrast, in the sheet illumination microscope system 1, illumination light at non-condensing positions contributes to entire expansion of the illumination light amount distribution in the observation direction. In this illumination state, the intensities of high spatial frequency compounds included in the illumination light at the condensing position becomes lower by the influence of the illumination light at non-condensing positions. This deteriorates the optical transfer characteristic of the sheet illumination microscope apparatus 10 (the optical transfer characteristic for the z axis direction particularly).

Figure 3:
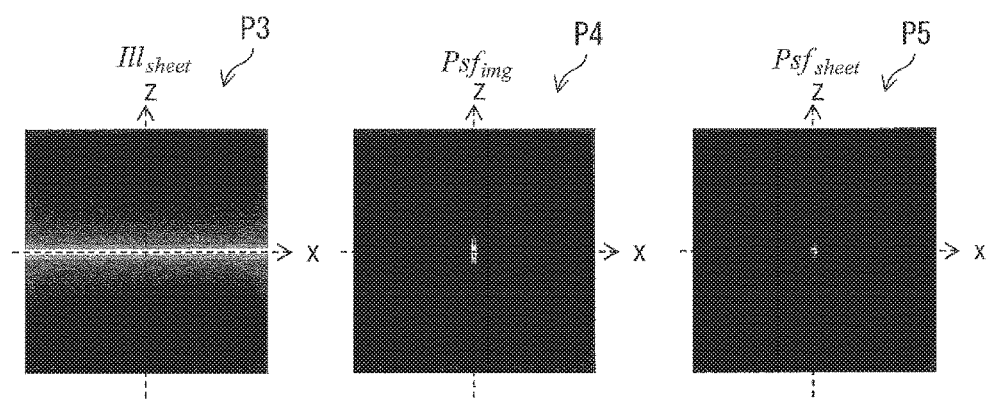
FIG. 3 explains the optical transfer characteristic of a sheet illumination microscope apparatus 10 in an illumination state in which the condensing position is moved.
Figure 4:
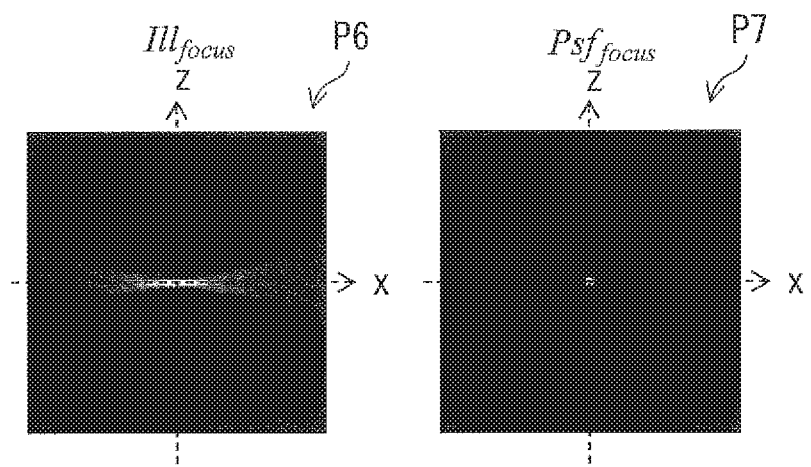
FIG. 4 explains the optical transfer characteristic of the sheet illumination microscope apparatus 10 in an illumination state in which the condensing position is fixed.

FIG. 3 explains the optical transfer characteristic of the sheet illumination microscope apparatus 10 in an illumination state in which the condensing position is moved to the illumination direction during the exposure period (referred to as the first illumination state hereinafter). FIG. 4 explains the optical transfer characteristic of the sheet illumination microscope apparatus 10 in an illumination state in which the condensing position is fixed during the exposure period (referred to as the second illumination state hereinafter). By referring to FIG. 3 and FIG. 4, explanations will be given for differences between the optical transfer characteristic of the sheet illumination microscope apparatus 10 in the first illumination state and the optical transfer characteristic of the sheet illumination microscope apparatus 10 in the second illumination state.

Note that the optical transfer characteristic of the sheet illumination microscope apparatus 10 in the first illumination state refers to the optical transfer characteristic of the sheet illumination microscope apparatus 10 under the first illumination light amount distribution formed by the movement of the condensing position during the exposure period in the illumination direction (first optical transfer characteristic). Also, the optical transfer characteristic of the sheet illumination microscope apparatus 10 in the second illumination state refers to the optical transfer characteristic of the sheet illumination microscope apparatus 10 under the second illumination light amount distribution formed by keeping the condensing position at a fixed position during the exposure period (second optical transfer characteristic).

The intensity distribution $Img_{sheet}$ of an image acquired by the sheet illumination microscope apparatus 10 in the first illumination state is given by the convolution (*) of the function Obj of the observed object S and the point spread function $Psf_{sheet}$ of the sheet illumination microscope apparatus 10 in the first illumination state as represented by expression (1). The point spread function $Psf_{sheet}$ is a function that represents the optical transfer characteristic of the sheet illumination microscope apparatus 10 in the first illumination state, and is given by the product (×) of the illumination light amount distribution $Ill_{sheet}$ in the first illumination state and the point image intensity distribution $Psf_{img}$ the observation optical system 25. Similarly, the intensity distribution $Img_{focus}$ of image acquired by the sheet illumination microscope apparatus 10 in the second illumination state is given by the convolution (*) of the function Obj of observed object S and the point spread function $Psf_{focus}$ of the sheet illumination microscope apparatus 10 in the second illumination state as represented by expression (3). The point spread function $Psf_{focus}$ is a function that represents the optical transfer characteristic of the sheet illumination microscope apparatus 10 in the second illumination state, and is given by the product (×) of the illumination light amount distribution $Ill_{focus}$ in the second illumination state and the point image intensity distribution $Psf_{img}$ of the observation optical system 25.

$$Img_{sheet} = Obj * Psf_{sheet} \tag{1}$$

$$Psf_{sheet} = Ill_{sheet} \times Psf_{img} \tag{2}$$

$$Img_{focus} = Obj * Psf_{focus} \tag{3}$$

$$Psf_{focus} = Ill_{focus} \times Psf_{img} \tag{4}$$

Also, a Fourier transform from expression (1) to expression (4) derives from expression (1-1) to expression (4-1). The functions with (~) are Fourier transforms of original functions.

$$\tilde{Img}_{sheet} = \tilde{Obj} \times \tilde{Psf}_{sheet} \tag{1-1}$$

$$\tilde{Psf}_{sheet} = \tilde{Ill}_{sheet} * \tilde{Psf}_{img} \tag{2-1}$$

$$\tilde{Img}_{focus} = \tilde{Obj} \times \tilde{Psf}_{focus} \tag{3-1}$$

$$\tilde{Psf}_{focus} = \tilde{Ill}_{focus} * \tilde{Psf}_{img} \tag{4-1}$$

In FIG. 3, image P3 shows illumination light amount distribution $Ill_{sheet}$ in the first illumination state in grayscale. Image P4 shows point image intensity distribution $Psf_{img}$ of the observation optical system 25 in grayscale. Image P5 shows the point spread function $Psf_{sheet}$ of the sheet illumination microscope apparatus 10 in the first illumination state in grayscale. In FIG. 4, image P6 shows the illumination light amount distribution $Ill_{focus}$ in the second illumination state in grayscale. Image P7 shows the point spread function $Psf_{focus}$ of the sheet illumination microscope apparatus 10 in the second illumination state in grayscale. In FIG. 3 and FIG. 4, the brighter (whiter) a region is, the greater the value of the region is.

As shown in FIG. 3, in the point spread function $Psf_{sheet}$, the optical transfer characteristic in the observation direction (z axis direction) has been improved compared with the point spread function $Psf_{img}$. However, as is obvious from comparison between FIG. 3 and FIG. 4, the point spread function $Psf_{sheet}$ has a distribution that is spread by influence of the illumination light amount distribution $Ill_{sheet}$ in the observation direction, and as a result represents an optical transfer characteristic that has deteriorated in the observation direction more than the point spread function $Psf_{focus}$. In other words, the sheet illumination microscope apparatus 10 exhibits different optical transfer characteristics between the first and the second illumination states, and the second illumination state results in high z resolving power at the condensing position.

Accordingly, while the sheet illumination microscope apparatus 10 can observe a wide field with a small number of acquired images by moving the condensing position of a light sheet in the illumination direction during the exposure period of the image pickup device 30, there is a possibility of insufficient resolution in the z axis direction (referred to as z resolution) of images acquired by the sheet illumination microscope apparatus 10.

In response to this, in the sheet illumination microscope system 1, the calculation device 40 performs a spatial frequency filtering process on image data of an image acquired by the sheet illumination microscope apparatus 10 in the first illumination state. The spatial frequency filtering process is a process of recovering z resolution that has deteriorated compared with z resolution of an image acquired in the second illumination state, to a level of z resolution of an image acquired in the second illumination state.

Figure 5:
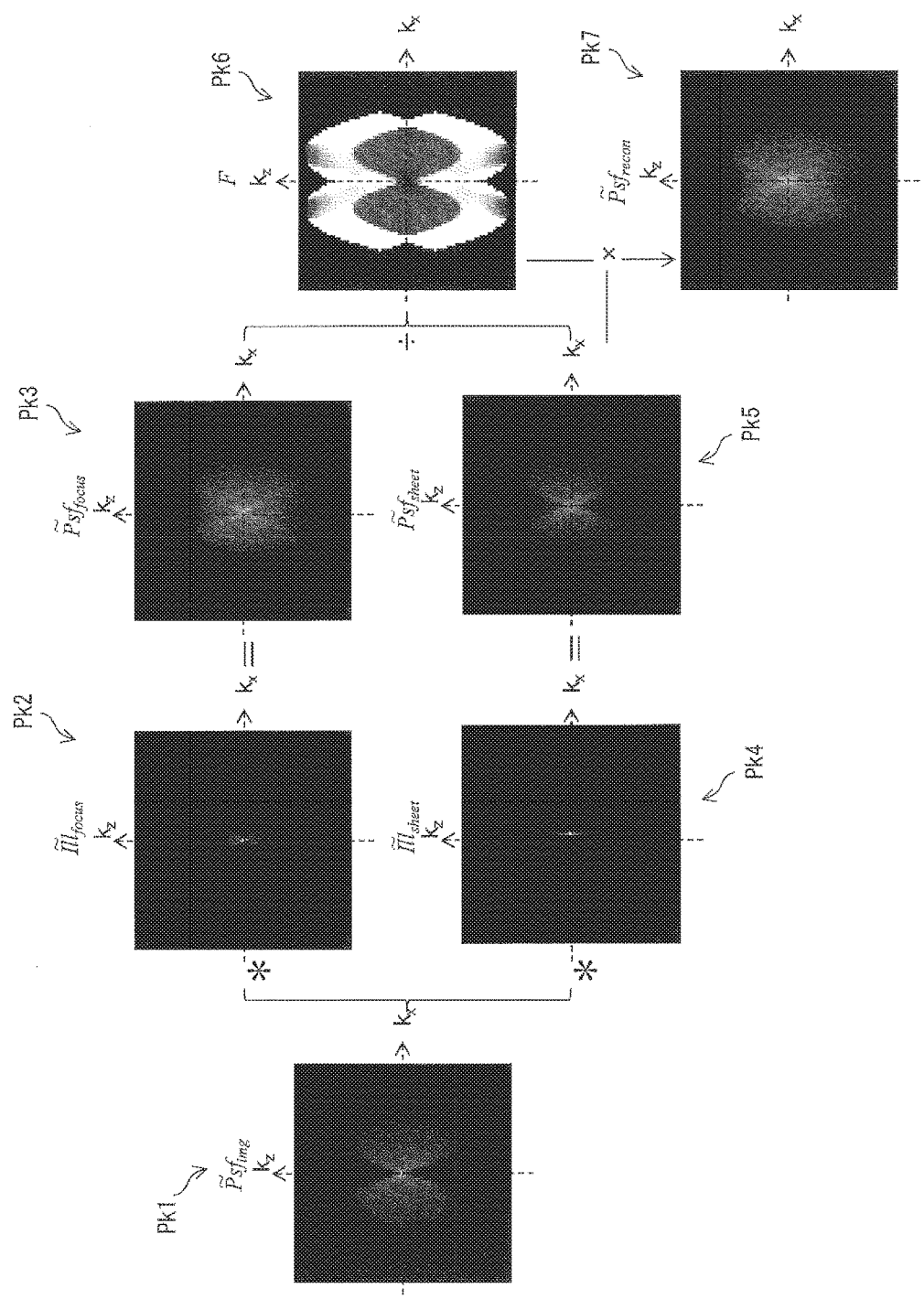
FIG. 5 explains the calculation method and operations of a spatial frequency filter.

FIG. 5 explains the calculation method and operations of a spatial frequency filter. Hereinafter, by referring to FIG. 5, explanations will be given for the recovery of z resolution caused by a spatial frequency filtering process.

In FIG. 5, image Pk1 shows in grayscale the Fourier transform $\tilde{P}sf_{img}$ of the point image intensity distribution $Psf_{img}$ of the observation optical system 25. Image Pk2 shows in grayscale the Fourier transform $\tilde{I}ll_{focus}$ of the illumination light amount distribution $Ill_{focus}$ in the second illumination state. Image Pk3 shows in grayscale the Fourier transform $\tilde{P}sf_{focus}$ of the point spread function $Psf_{focus}$ of the sheet illumination microscope apparatus 10 in the second illumination state. Image Pk4 shows in grayscale the Fourier transform $\tilde{I}mg_{sheet}$ of the illumination light amount distribution $Ill_{sheet}$ in the first illumination state. Image Pk5 shows in grayscale the Fourier transform $\tilde{P}sf_{sheet}$ of the point spread function $Psf_{sheet}$ of the sheet illumination microscope apparatus 10 in the first illumination state. Image Pk6 shows a characteristic of a filter used by the spatial frequency filtering process. Image Pk7 shows in grayscale the Fourier transform $\tilde{P}sf_{recon}$ of the point spread function $Psf_{recon}$ of the sheet illumination microscope apparatus 10 acquired by the spatial frequency filtering process.

As shown in FIG. 5, $\tilde{P}sf_{focus}$ is calculated by the expression (4-1), and $\tilde{P}sf_{sheet}$ is calculated by the expression (2-1). When the spatial frequency filter F (referred to as filter F hereinafter) is defined as the ratio between $\tilde{P}sf_{focus}$ and $\tilde{P}sf_{sheet}$ (division), $\tilde{P}sf_{recon}$ that is the product (×) of the filter F and $\tilde{P}sf_{sheet}$ is equal to $\tilde{P}sf_{focus}$ (=$\tilde{I}ll_{focus}*\tilde{P}sf_{img}$) as represented by the expression (5). This means that an optical characteristic of the same level as that of the optical transfer characteristic of the sheet illumination microscope apparatus 10 in the second illumination state can be acquired by a spatial frequency filtering process using the filter F.

$$\tilde{P}sf_{recon}=\tilde{I}ll_{focus}*\tilde{P}sf_{img}=\tilde{P}sf_{sheet}\times F \quad (5)$$

Further, from expression (1-1) and expression (5), expression (6) and expression (7) are derived.

$$\tilde{I}mg_{recon}=\tilde{I}mg_{sheet}\times F=\tilde{O}bj\times\tilde{P}sf_{recon} \quad (6)$$

$$Img_{recon}=OBj*Psf_{recon} \quad (7)$$

According to expressions (6) and (7), by operating the filter F on an image acquired in the first illumination state, the z resolution of the filter F operated image can be recovered to the same level of that of an image acquired in the second illumination state. Also, an image (intensity distribution $Img_{recon}$) on which filter F operated has high z resolution over an x axis directional range wider than that of an image acquired in the second illumination state.

Accordingly, in the sheet illumination microscope system 1, the calculation device 40 performs a spatial frequency filtering process in which a filter F is made to operate on the image data of an image acquired in the first illumination state, and thereby an image having high z resolution over the entire illuminated scope can be acquired. Therefore, the sheet illumination microscope system 1 makes it possible to observe a wide field-of-view at high z resolving power with a small number of acquired images in one-photon excitation fluorescence observation. Also, the calculation device 40 can improve the resolution of images acquired by the sheet illumination microscope apparatus 10.

In the above, a Fourier filtering process in a spatial frequency domain has been described as an example of a spatial frequency filtering process, a Fourier filtering process can be replaced with a convolution filtering process in a space domain. In a convolution filtering process, a Fourier transform and an inverse Fourier transform of an image conducted before and after the Fourier filtering process can be omitted. This makes it possible to reduce the calculation amount required for processing images, resulting in reduction in the calculation time. Also, for a convolution filter, a one-dimensional convolution kernel that is parallel to the observation direction may be used. Limiting the convolution kernel to a one-dimensional one realizes great reduction in the calculation time.

While an example has been used in which a spatial frequency filtering process is performed on the basis of the ratio between the first optical transfer characteristic and the second optical transfer characteristic of the sheet illumination microscope apparatus 10, the spatial frequency filtering process may be performed on the basis of the first and the second optical transfer characteristics of the sheet illumination microscope apparatus 10. When for example the values of the Fourier filter becomes divergent because of the division of $\tilde{P}sf_{focus}$ and $\tilde{P}sf_{sheet}$, a Fourier filter whose values are limited to a prescribed maximum value may be used. Also, a new Fourier filter (second Fourier filter) may be used, the new Fourier filter (second Fourier filter) being calculated by applying apodization for suppressing the intensity of spatial frequency components beyond a prescribed spatial frequency to the Fourier filter (first Fourier filter) calculated in the above manner. The application of apodization makes it possible to suppress amplification of noise noticeable in a high-frequency wave region. Also, a second Fourier filter may be used, the second Fourier filter being calculated by applying a spherical mask for improving the isotropy of the first Fourier filter.

Hereinafter, specific explanations will be given for respective examples of the present invention.

EXAMPLE 1

Figure 6A:
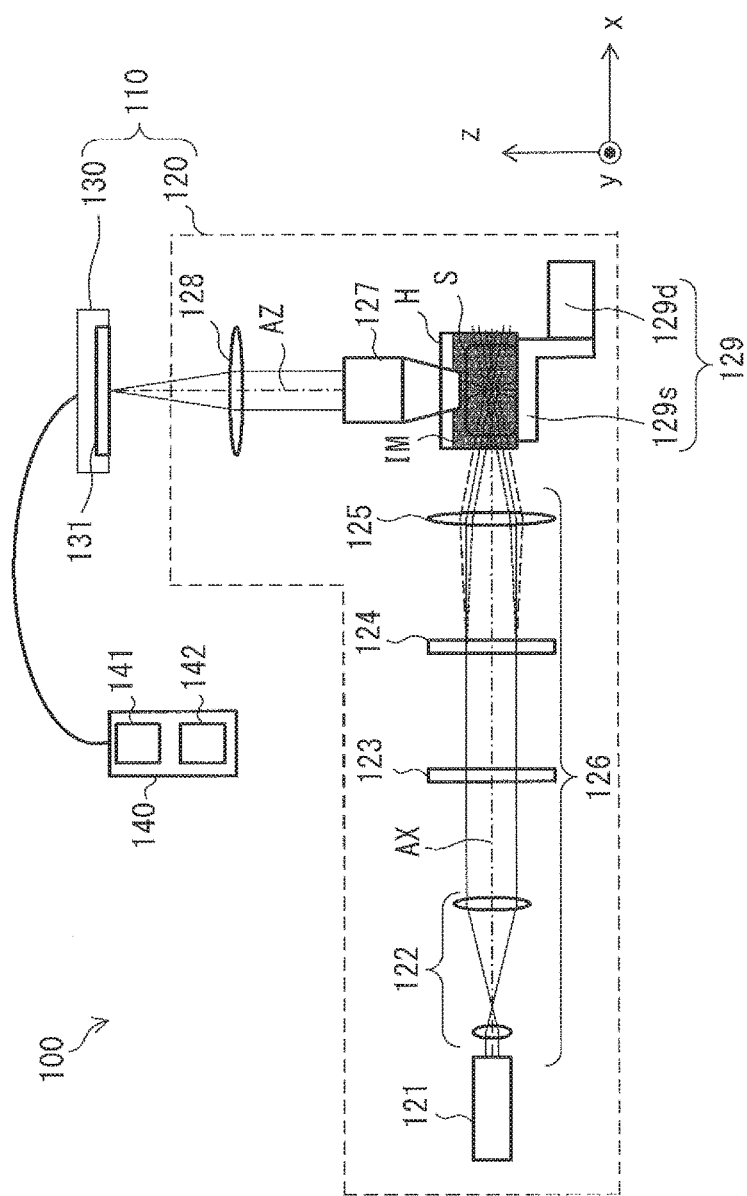
FIG. 6A is an x-z sectional view showing a configuration of a sheet illumination microscope system 100 according to example 1.
Figure 6B:
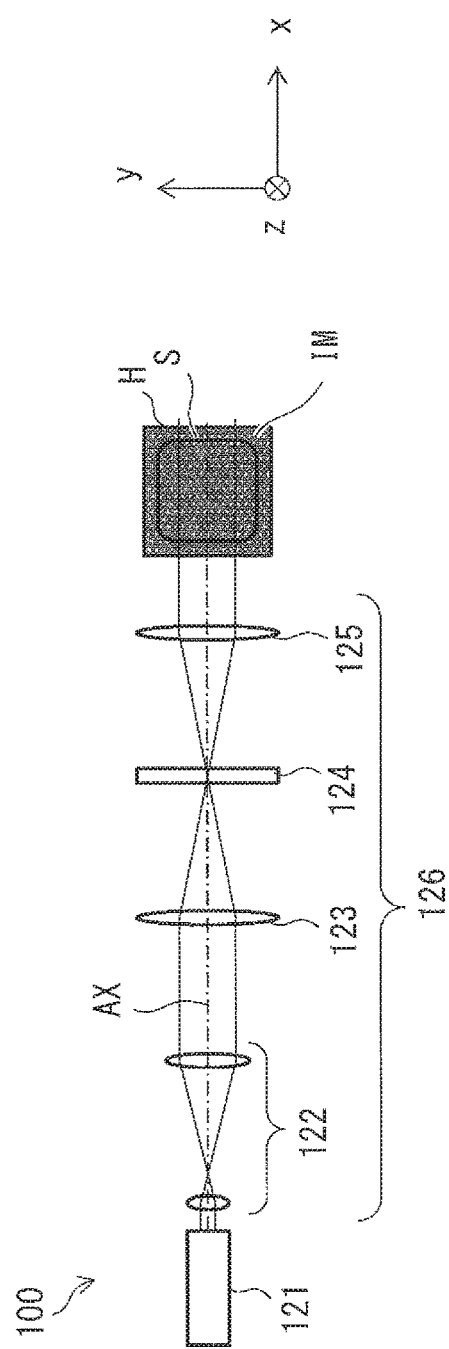
FIG. 6B is an x-y sectional view showing a configuration of the sheet illumination microscope system 100 according to example 1.

FIG. 6A and FIG. 6B show a configuration of a sheet illumination microscope system 100 according to the present example, with FIG. 6A showing the x-z section and FIG. 6B showing the x-y section. Note that the x axis direction, the y axis direction and the z axis direction are given the same definitions as those in FIG. 1A.

The sheet illumination microscope system 100 includes a sheet illumination microscope apparatus 110 and a computer 140. Observed object S observed by the sheet illumination microscope system 100 is immersed in immersion liquid IM having a refractive index roughly identical to that of observed object S in holder H having its upper plane open and side planes made of optically transparent glass.

The sheet illumination microscope apparatus 110 is a one-photon excitation fluorescence microscope, and includes a microscope body 120 and an image pickup device 130. The sheet illumination microscope apparatus 110 is configured to acquire a two-dimensional image of observed object S under the first illumination light amount distribution formed by the movement of the condensing position of a light sheet in the illumination direction, the light sheet being emitted to observed object S from the illumination direction orthogonal to the observation direction.

The microscope body 120 includes a light source 121, an illumination optical system 126, an objective lens 127, a tube lens 128 and an observed object moving device 129. The illumination optical system 126 is an optical system that emits a light sheet to observed object S from the illumination direction, and includes a beam expander 122, a cylindrical lens 123, a refractive-power variable element 124 and a condensing lens 125.

An example of the light source 121 is a laser device that emits a laser beam. The beam expander 122 expands the diameter of laser beam emitted from the light source 121. The cylindrical lens 123 is a lens having a refractive power only for one of the two planes (x-y plane and x-z plane) that are orthogonal to each other and that are along the optical axis AX, and is arranged so that it has a refractive power on the x-y plane. The cylindrical lens 123 condenses laser beam on the font-side focal plane of the condensing lens 125 and into a linear shape that extends in the observation direction.

The refractive-power variable element 124 is an optical element that is arranged on or near the front-side focal plane of the condensing lens 125 and that has a variable refractive power. In view of an ability to move a condensing position at a high speed, it is desirable that the refractive-power variable element 124 be for example a liquid lens, which can vary the lens shape or the lens thickness. The refractive-power variable element 124 rarely affects laser beam on the x-y plane, on which the laser beam has a small beam diameter, while it changes the convergence state or the divergence state of laser beam in accordance with the refractive power on the x-z plane. In the sheet illumination microscope system 100, the condensing position of a light sheet is changed by varying the refractive power of the refractive-power variable element 124, and accordingly the refractive-power variable element 124 is a condensing position longitudinal movement device that moves the condensing position of a light sheet in the illumination direction. Note that FIG. 6A shows a situation where three light fluxes (solid lines, dotted-dashed lines and dashed lines) generated when the refractive power of the refractive-power variable element 124 is changed to the first through third refractive powers are condensed at different positions. The refractive power of the refractive-power variable element 124 varies for example in a vibrational manner so that the condensing position of a light sheet traverses the field-of-view. The condensing lens 125 converts laser beam that has passed through the refractive-power variable element 124 into a light sheet that is thin in the observation direction so as to emit the light sheet to observed object S.

The objective lens 127 is an immersion objective lens adapted to the refractive index of the immersion liquid IM, and has long working distance. The objective lens 127 and the tube lens 128 constitute the observation optical system that projects the image of observed object S onto the image pickup device 130. The illumination optical system 126 and the observation optical system are arranged so that the optical axis AX of the illumination optical system 126 and the optical axis AZ of the observation optical system are orthogonal to each other and the front-side focal plane of the observation optical system and the illuminated area in which a light sheet is formed coincide with each other.

The observed object moving device 129 includes a stage 129s and a stage drive device 129d. The stage drive device 129d includes for example a stepping motor, a piezoelectric element, etc. The observed object moving device 129 moves the stage 129s in the observation direction (z axis direction) so as to move the observed object S on the stage 129s in the observation direction.

The image pickup device 130 is for example a CCD camera having an image pickup element 131, which is a CCD image sensor. The image pickup device 130 receives fluorescence from the observed object S for a sufficient period to allow the condensing position of a light sheet to traverse the field-of-view, and outputs an image signal of the two-dimensional image of observed object S to the computer 140. Also, the image pickup device 130 acquires a two-dimensional image of observed object S each time the observed object moving device 129 moves observed object S in the observation direction at constant intervals in accordance with an instruction from the computer 140, and thereby outputs to the computer 140 image data of a plurality of two-dimensional images acquired in a plurality of states with different height levels of observed object S. Note that it is desirable that the observed object moving device 129 move observed object S so that the entire imaging target area is imaged. The imaging target area is for example an area in which the illumination light amount distribution (first illumination light amount distribution) formed by moving the condensing position of a light sheet with the height level of observed object S set at a certain level is spread in the z axis direction.

The computer 140 includes a processor 141 and a memory 142 coupled to the processor 141. The computer 140 is an image processing device that performs, in accordance with the optical transfer characteristic of the optical transfer characteristic 110, a spatial frequency filtering process on image data of a three-dimensional image of observed object S constructed from a plurality of two-dimensional images. The computer 140 functions as the image signal acquisition unit 41, the three-dimensional-image constructing unit 42 and the spatial frequency filtering process unit 43 shown in FIG. 2 by the processor 141 executing a program stored in the memory 142.

Figure 7A:
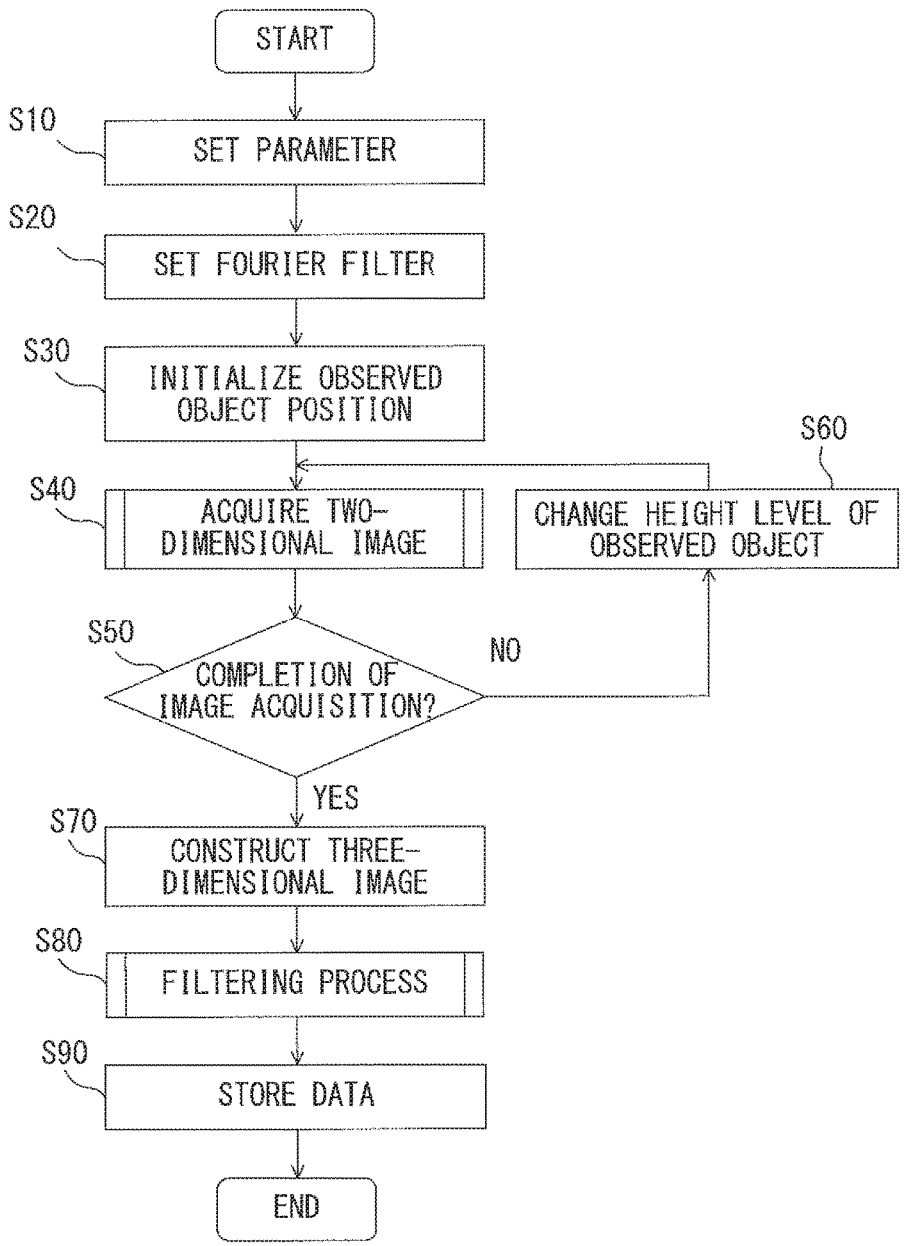
FIG. 7A is a flowchart showing the flow of a process performed by the sheet illumination microscope system 100.
Figure 7B:
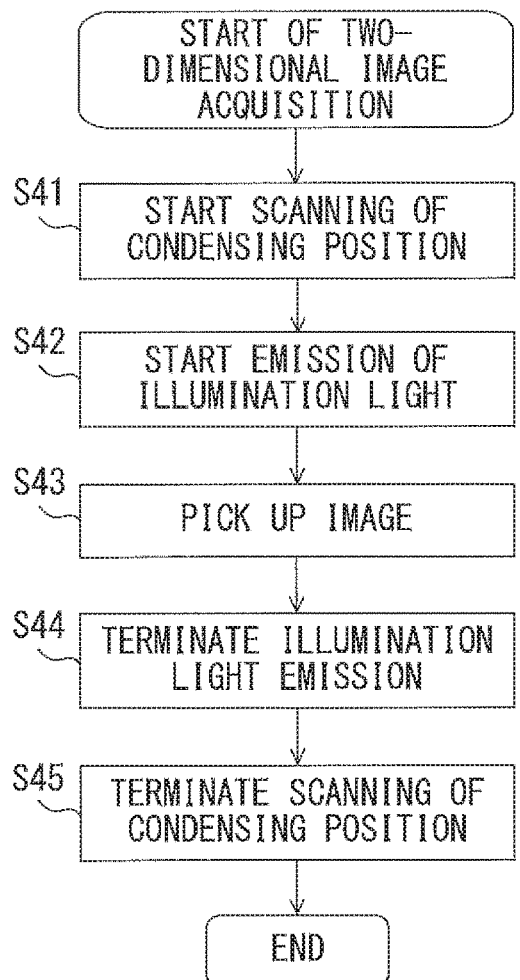
FIG. 7B is a flowchart showing the flow of the two-dimensional image acquisition process shown in FIG. 7A.
Figure 7C:
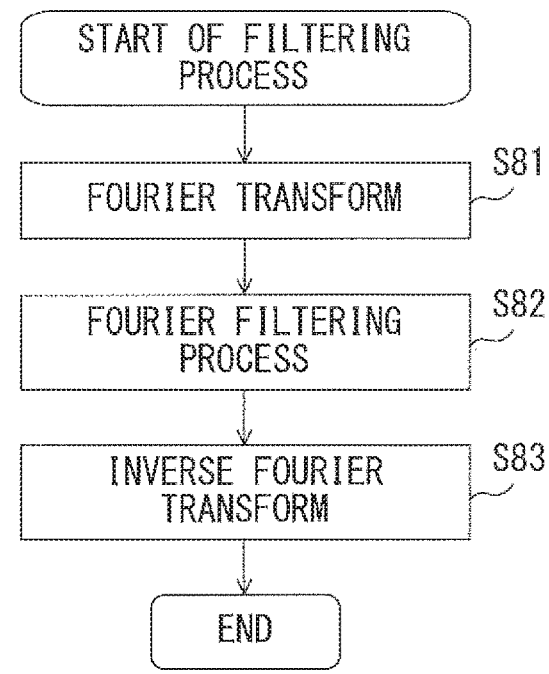
FIG. 7C is a flowchart showing the flow of the filtering process shown in FIG. 7A.

FIG. 7A is a flowchart showing the flow of a process performed by the sheet illumination microscope system 100. FIG. 7B is a flowchart showing the flow of the two-dimensional image acquisition process shown in FIG. 7A. FIG. 7C is a flowchart showing the flow of the filtering process shown in FIG. 7A. Hereinafter, by referring to FIG. 7A through FIG. 7C, specific explanations will be given for the processes performed by the sheet illumination microscope system 100.

The sheet illumination microscope system 100 first sets various types of parameters (step S10). In this example, the computer 140 sets parameters necessary for calculating the spatial frequency filter on the basis of information input from the user. For example, the numerical aperture (NA) of the objective lens 127, the wavelength of the laser beam from the light source 121, the refractive index of observed object S, the pixel size of the image pickup element 131, etc. are set.

Next, the sheet illumination microscope system 100 sets a Fourier filter (step S20). In this example, the computer 140 calculates the optical transfer characteristic of the sheet illumination microscope apparatus 110 from the information set in step S10, and calculates and sets a Fourier filter on the basis of the calculate optical transfer characteristic. Specifically, the Fourier filter may be calculated on the basis of the first and the second optical transfer characteristics of the sheet illumination microscope apparatus 110. Also, on the basis of the information set in step S10, the computer 140 searches the database that is provided to the memory 142 in advance. The computer 140 may set a Fourier filter extracted as a result of the search.

The sheet illumination microscope system 100 thereafter initializes the position of observed object S (step S30). The sheet illumination microscope system 100 repeatedly moves the height level of observed object S within a prescribed height level range, and in each repetition repeatedly acquires two-dimensional images of observed object S (from step S40 through step S60).

In the two-dimensional image acquisition process (step S40), the sheet illumination microscope apparatus 110 acquires a two-dimensional image of observed object S under the first illumination light amount distribution formed by the illumination-directional movement of the condensing position of a light sheet emitted to observed object S from the illumination direction orthogonal to the observation direction. Specifically, the sheet illumination microscope system 100 starts scanning the condensing position (step S41), starts the emission of the illumination light (laser beam) (step S42), and picks up an image of observed object S (step S43). In this example, the computer 140 for example starts emission of laser beam from the light source 121 so as to vary the refractive power of the refractive-power variable element 124 continuously. In synchronization with these processes, the image pickup device 130 starts the exposure control, and outputs an image signal to the computer 140 during a period in which the condensing position of a light sheet traverses the field-of-view at a prescribed speed.

When the condensing position completes the traverse across the field-of-view, the sheet illumination microscope system 100 terminates the emission of the illumination light (laser beam) (step S44), terminates the scanning of the condensing position (step S45), and terminates the two-dimensional image acquisition process.

Upon the termination of the two-dimensional image acquisition process, the sheet illumination microscope system 100 determines whether or not the planned acquisition of all two-dimensional images has been completed. When it has not been completed, the observed object moving device 129 changes the height level of observed object S by a prescribed distance (step S60). This can also be interpreted as moving the condensing position of a light sheet based on observed object S in the observation direction. Thereafter, the sheet illumination microscope apparatus 110 again acquires a two-dimensional image (step S40).

Upon the completion of the acquisition of all two-dimensional images, the sheet illumination microscope system 100 constructs a three-dimensional image (step S70). In this example, the computer 140 constructs a three-dimensional image from a plurality of two-dimensional images output from the image pickup device 130. Thereafter, the sheet illumination microscope system 100 performs a filtering process on the image data of the three-dimensional image constructed in step S70 (step S80). In this example, the computer 140 first performs a Fourier transform on the image data of the three-dimensional image constructed by the computer 140 in step S70 (step S81). Then, the computer 140 uses the Fourier filter set in step S20 so as to perform the Fourier filtering process on the image data acquired by the conversion. This Fourier filtering process is a spatial frequency filtering process of changing the spatial frequency characteristic of the three-dimensional image in accordance with the optical transfer characteristic of the sheet illumination microscope apparatus 110. As the last step, the computer 140 performs an inverse Fourier transform (step S83), reproduces the three-dimensional image, and terminates the filtering process.

Upon the termination of the filtering process, the sheet illumination microscope system 100 stores, in the memory 142, image data of observed object S with z resolution improved by the filtering process (step S90), and terminates the series of the processes.

According to the sheet illumination microscope system 100 of the present example, it is possible to observe a wide field-of-view with a small number of acquired images by moving the condensing position of a light sheet in the illumination direction during the exposure period of the image pickup device 130. Also, the computer 140 performs a spatial frequency filtering process on image data of a three-dimensional image of observed object S on the basis of the optical transfer characteristic of the sheet illumination microscope apparatus 110, making it possible to acquire an image having high z resolution over the entire illuminated area by a light sheet. Thus, according to the sheet illumination microscope system 100, it is possible to observe a wide field-of-view with a small number of acquired images at high z resolving power in one-photon excitation fluorescence observation. Also, the computer 140 can improve the resolution of images acquired by the sheet illumination microscope apparatus 110.

Also, the sheet illumination microscope system 100 can suppress the number of acquired images, resulting in reduction in time for acquiring images of observed object S. This reduces illumination time as well, making it possible to reduce damage to observed object S. As a result, it is possible to delay progress of photobleaching and to reduce influence of a phototoxic property.

Note that an example of performing a spatial frequency filtering process that uses a Fourier filter has been described for the sheet illumination microscope system 100, a spatial frequency filtering process using a convolution filter may be performed.

Also, in the Fourier filtering process in step S82, in order to improve the calculation efficiency, filters may be commonized for the x-y plane direction in which the illumination light amount distribution is substantially uniform. It is also possible to divide the x-y plane into a plurality of areas so that a filter is used for each area in accordance with the illumination state of the area.

EXAMPLE 2

Figure 8A:
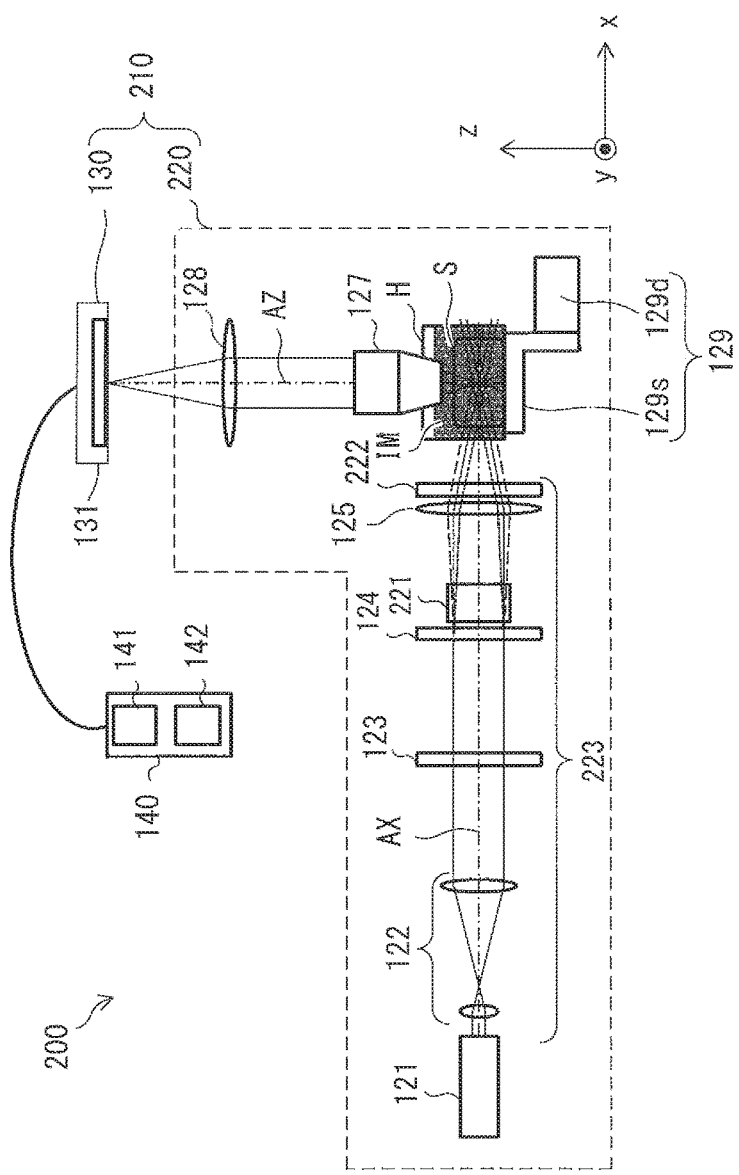
FIG. 8A is an x-z sectional view showing a configuration of a sheet illumination microscope system 200 according to example 2.
Figure 8B:
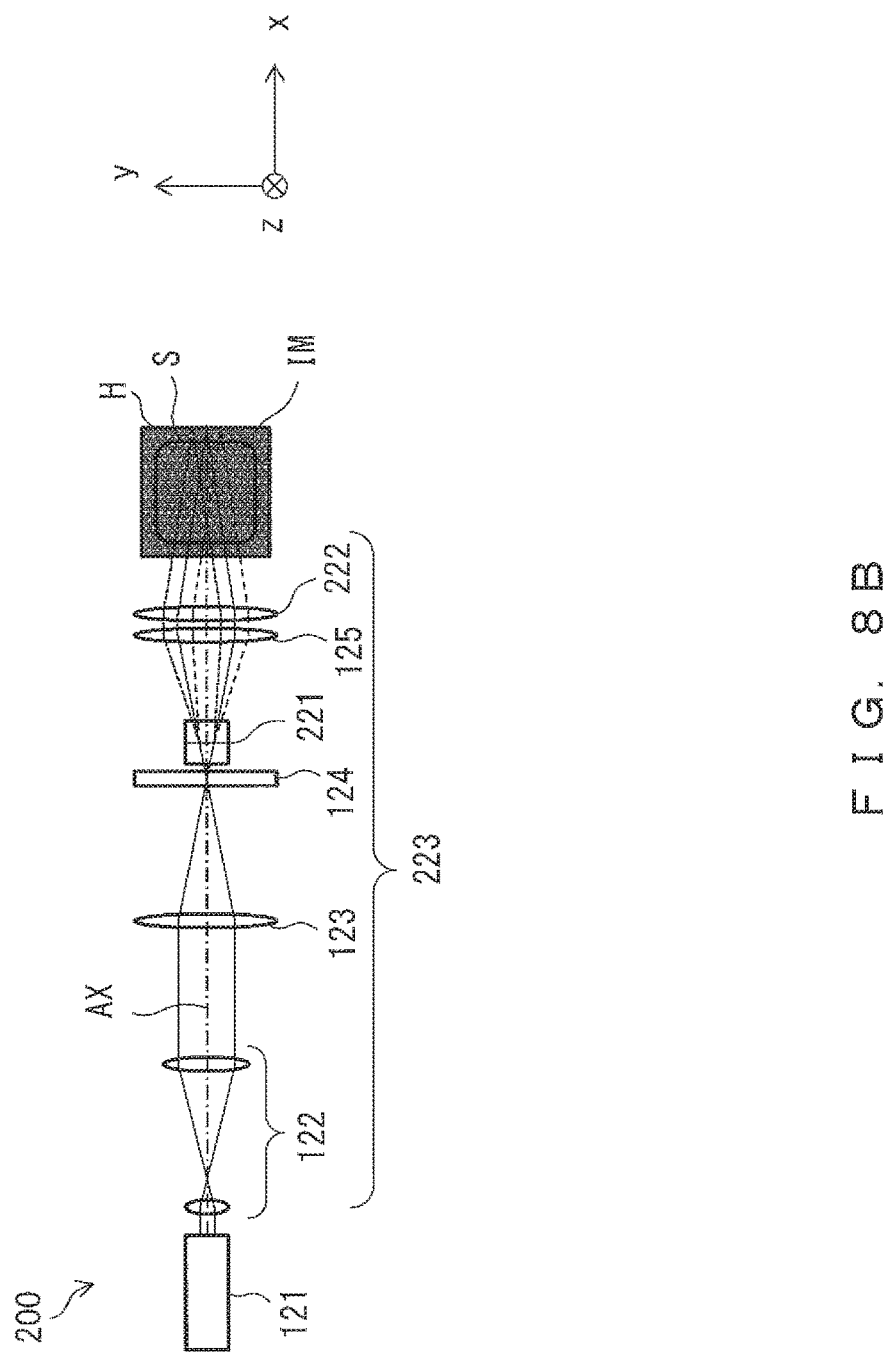
FIG. 8B is an x-y sectional view showing a configuration of the sheet illumination microscope system 200 according to example 2.

FIG. 8A and FIG. 8B show a configuration of a sheet illumination microscope system 200 according to the present example, with FIG. 8A showing the x-z section and FIG. 8B showing the x-y section. Note that the x axis direction, the y axis direction and the z axis direction are given the same definitions as those in FIG. 1A.

The sheet illumination microscope system 200 is different from the sheet illumination microscope system 100 in that it is provided with a sheet illumination microscope apparatus 210 instead of the sheet illumination microscope apparatus 110. The sheet illumination microscope apparatus 210 is different from the sheet illumination microscope apparatus 110 in that it is provided with a microscope body 220 instead of the microscope body 120. Further, the microscope body 220 is different from the microscope body 120 in that it is provided with an illumination optical system 223 instead of the illumination optical system 126.

The illumination optical system 223 is different from the illumination optical system 126 in that it is provided with a deflection element 221 on or near the front-side focal plane of the condensing lens 125 and that it is provided with a cylindrical lens 222 as a second cylindrical lens near the condensing lens 125.

The deflection element 221 is a deflector that deflects a light sheet. The deflection element 221 is a scanner for scanning observed object S in the y axis direction by using a light sheet, and desirably is for example a galvano mirror, an Acousto Optic Modulator (AOM), etc. in order to realize high speed scanning. Also, in order to maintain the direction of the illumination light axis of a light sheet, it is desirable that the deflection element 221 be disposed on or near the front-side focal plane of the condensing lens 125. Note that FIG. 8B shows a situation where three light fluxes (solid lines, dotted-dashed lines and dashed lines) generated when the deflection state in the y axis direction is changed by the deflection element 221 to the first through third deflection states.

The cylindrical lens 222 is a lens that converts the state of a light sheet in observed object S into a convergence state or a divergence state on the x-y plane. The cylindrical lens 222 is arranged so that it has a refractive power on the x-y plane similarly to the cylindrical lens 123.

Similarly to the sheet illumination microscope system 100, the sheet illumination microscope system 200 of the present example as well can observe a wide field-of-view with a small number of acquired images at high z resolving power in one-photon excitation observation. With the deflection element 221, it is possible to form an illuminated area wider in the y axis direction during an exposure period. This makes it possible to observe a wider field-of-view with a number of acquired images smaller than that acquired by the sheet illumination microscope system 100. Further, a portion that causes scattering or absorption of light or a portion that has a refractive index different from that of the surrounding portion (such as bubbles etc.) involved in observed object S sometimes results in a shadow behind such a portion in sheet illumination in which a light sheet is emitted from the direction orthogonal to the observation direction. The sheet illumination microscope system 200 is provided with the cylindrical lens 222 and thereby a light sheet converges or diverges in observed object S. This leads to a situation where by performing scanning in which a light sheet is moved in the y axis direction, the light can be guided to a portion behind a light shielding object such as a bubble etc. Therefore, according to the sheet illumination microscope system 200, it is possible to suppress a shadow generated by sheet illumination so as to make it less noticeable.

EXAMPLE 3

Figure 9B:
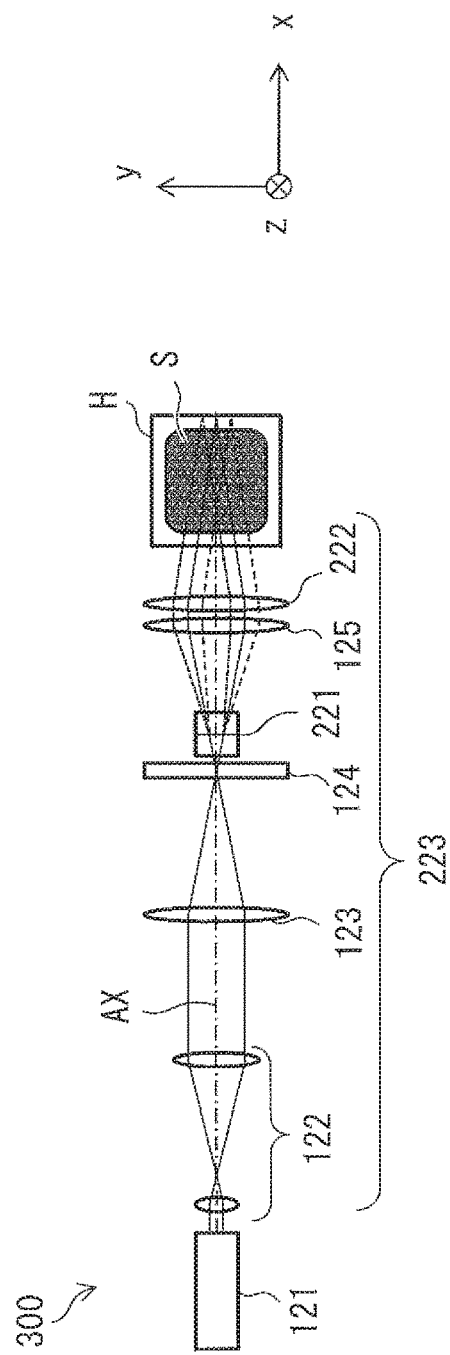
FIG. 9B is an x-y sectional view showing a configuration of the sheet illumination microscope system 300 according to example 3.

FIG. 9A and FIG. 9B show a configuration of a sheet illumination microscope system 300 according to the present example, with FIG. 9A showing the x-z section and FIG. 9B showing the x-y section. Note that the x axis direction, the y axis direction and the z axis direction are given the same definitions as those in FIG. 1A.

The sheet illumination microscope system 300 is different from the sheet illumination microscope system 200 in that it is provided with a sheet illumination microscope apparatus 310 instead of the sheet illumination microscope apparatus 210.

The sheet illumination microscope apparatus 310 is different from the sheet illumination microscope apparatus 210 in that it is provided with a microscope body 320 instead of the microscope body 220. Further, the microscope body 320 is different from the microscope body 220 in that it is provided with an objective lens 321 instead of the objective lens 127, that immersion liquid IM is not used and that the deflection element 221 also deflects a light sheet in the z axis direction in addition to the y axis direction.

The objective lens 321 is a dry objective lens with long-working distance, and the objective lens 321 and the tube lens 128 constitute the observation optical system that projects the image of the observed object S onto the image pickup device 130.

In the sheet illumination microscope system 100 provided with a dry objective lens (objective lens 321), movement of observed object S by the observed object moving device 129 in the observation direction moves the focal plane vertically due to influence of the refractive-index difference between the air and observed object S. This also changes the positional relationship between the focal plane and the optical sheet. In response to this, in the sheet illumination microscope system 300, in order to maintain the positional relationship between the focal plane and a light sheet, the deflection element 221 deflects the light sheet so as to shift it in the observation direction in accordance with the distance over which the observed object S has moved the focal plane in the observation direction. It is thus desirable that the deflection element 221 be a biaxial deflection element. Note that FIG. 9A shows a situation where three light fluxes (solid lines, dotted-dashed lines and dashed lines) generated when the deflection state in the z axis direction is changed by the deflection element 221 to the first through third deflection states. The way the refractive power of the refractive-power variable element 124 condenses the light to different condensing positions is omitted.

FIG. 10 is a flowchart showing the flow of the process performed by the sheet illumination microscope system 300. The process performed by the sheet illumination microscope system 300 is different from that performed by the sheet illumination microscope system 100 shown in FIG. 7A in that it contains step S35 and step S65.

The sheet illumination microscope system 300 initializes the height level of the illumination light axis (step S35) before starting the two-dimensional image acquisition process (step S40). In this example, the deflection state of the deflection element 221 is initialized.

Further, the sheet illumination microscope system 300 modifies the height level of the illumination light axis (step S65) after the observed object moving device 129 changes the height level of observed object S by a prescribed distance. In this example, the deflection element 221 deflects an optical sheet in the observation direction in accordance with the distance over which the focal plane moved in the observation direction. The process of modifying the height level of the illumination light axis may be performed before the movement of observed object S.

According to the sheet illumination microscope system 300 of the present example as well, similarly to the sheet illumination microscope system 200, it is possible to observe a wide field-of-view with a small number of acquired images at high z resolving power in one-photon excitation fluorescence observation. The sheet illumination microscope system 300 is similar to the sheet illumination microscope system 200 also in that it can observe a wide field-of-view with a number of acquired images smaller than that acquired by the sheet illumination microscope system 100 and that a shadow generated in sheet illumination can be suppressed and can be made to be less noticeable.

The above described embodiments and examples are specific examples for facilitating the understanding of the present invention, while the present invention is not limited to these embodiments or examples. Various alterations and modifications can be made to the sheet illumination microscope systems, the image processing devices, the sheet illumination microscopy and the storage media without departing from the inventions defined by the claims. A combination of some of the features in contexts of the individual examples explained in this specification may be treated as a single example. In examples 2 and 3 for example, while a sheet illumination microscope system having the deflection element 221 and the cylindrical lens 222 is exemplified; only one of them may be provided.

What is claimed is:

1. A sheet illumination microscope system comprising:
a microscope apparatus configured to acquire a two-dimensional image of an observed object under a first illumination light amount distribution, the first illumination light amount distribution being formed by moving a condensing position of a light sheet in an illumination direction orthogonal to an observation direction, and the light sheet being emitted to the observed object from the illumination direction; and
an image processing device configured to perform a spatial frequency filtering process on image data of a three-dimensional image of the observed object in accordance with an optical transfer characteristic of the microscope apparatus, the spatial frequency filtering process being a process of changing a spatial frequency characteristic included in the three-dimensional image, and the three-dimensional image being constructed from a plurality of two-dimensional images acquired by the microscope apparatus,
wherein the image processing device performs the spatial frequency filtering process on the image data of the three-dimensional image on the basis of a first optical transfer characteristic of the microscope apparatus under the first illumination light amount distribution and a second optical transfer characteristic of the microscope apparatus under a second illumination light amount distribution, the second illumination light amount distribution being formed by keeping the condensing position of the light sheet at a fixed position, and
wherein the image processing device performs the spatial frequency filtering process on the image data of the three-dimensional image on the basis of a ratio between the first optical transfer characteristic and the second optical transfer characteristic.

2. The sheet illumination microscope system according to claim 1, wherein
the spatial frequency filtering process is a Fourier filtering process in a spatial frequency domain for the image data of the three-dimensional image.

3. The sheet illumination microscope system according to claim 2, wherein
the Fourier filtering process uses a second Fourier filter, the second Fourier filter being acquired by applying apodization for suppressing intensity of a spatial frequency component included in the image data of the three-dimensional image to a first Fourier filter, the spatial frequency component having a spatial frequency beyond a prescribed spatial frequency, and the first Fourier filter being calculated on the basis of the optical transfer characteristic of the microscope apparatus.

4. The sheet illumination microscope system according to claim 2, wherein
the Fourier filtering process uses a second Fourier filter, the second Fourier filter being acquired by applying a spherical mask for improving isotropy to a first Fourier filter, and the first Fourier filter being calculated on the basis of the optical transfer characteristic of the microscope apparatus.

5. The sheet illumination microscope system according to claim 1, wherein
the spatial frequency filtering process is a convolution filtering process in a space domain for the image data of the three-dimensional image.

6. The sheet illumination microscope system according to claim 5, wherein
the convolution filtering process uses a one-dimensional convolution kernel that is parallel to an observation direction.

7. The sheet illumination microscope system according to claim 1, wherein
the microscope apparatus includes:
an image pickup device configured to acquire a two-dimensional image of the observed object;
an observation optical system configured to project an image of the observed object onto the image pickup device; and
an illumination optical system configured to emit the light sheet to the observed object from the illumination direction, wherein
the illumination optical system includes a condensing position longitudinal movement device that moves the condensing position of the light sheet in the illumination direction.

8. The sheet illumination microscope system according to claim 7, wherein
the microscope apparatus further includes an observed object movement device that moves the observed object in the observation direction.

9. The sheet illumination microscope system according to claim 7, wherein
the illumination optical system further includes a deflector configured to deflect the light sheet.

10. An image processing device comprising:
a spatial frequency filtering process unit configured to perform a spatial frequency filtering process on image data of a three-dimensional image of an observed object in accordance with an optical transfer characteristic of a microscope apparatus, the spatial frequency filtering process being a process of changing a spatial frequency characteristic included in the three-dimensional image, the three-dimensional image being constructed from a plurality of two-dimensional images of the observed object acquired by the microscope apparatus under a first illumination light amount distribution, the first illumination light amount distribution being formed by moving a condensing position of a light sheet in an illumination direction orthogonal to an observation direction, and the light sheet being emitted to the observed object from the illumination direction,
wherein the spatial frequency filtering process performs the spatial frequency filtering process on the image data of the three-dimensional image on the basis of a first optical transfer characteristic of the microscope apparatus under the first illumination light amount distribution and a second optical transfer characteristic of the microscope apparatus under a second illumination light amount distribution, the second illumination light amount distribution being formed by keeping the condensing position of the light sheet at a fixed position, and
wherein the spatial frequency filtering process is performed on the image data of the three-dimensional image on the basis of a ratio between the first optical transfer characteristic and the second optical transfer characteristic.

11. A sheet illumination microscopy method comprising:
acquiring, by a microscope, a two-dimensional image of an observed object under a first illumination light amount distribution, the first illumination light amount distribution being formed by moving a condensing position of a light sheet in an illumination direction orthogonal to an observation direction, and the light sheet being emitted to the observed object from the illumination direction;

moving the condensing position of the light sheet based on the observed object in the observation direction;

constructing image data of a three-dimensional image of the observed object from a plurality of two-dimensional images, the plurality of two-dimensional images being acquired by repeating the acquisition of the two-dimensional image and the movement in the observation direction; and performing a spatial frequency filtering process on the image data of the three-dimensional image in accordance with an optical transfer characteristic of the microscope apparatus, the spatial frequency filtering process being a process of changing a spatial frequency characteristic included in the three-dimensional image, wherein the spatial frequency filtering process is a process of changing a spatial frequency characteristic included in the image data of the three-dimensional image on the basis of a first optical transfer characteristic of the microscope apparatus under the first illumination light amount distribution and a second optical transfer characteristic of the microscope apparatus under a second illumination light amount distribution, the second illumination light amount distribution being formed by keeping the condensing position of the light sheet at a fixed position, and wherein the spatial frequency filtering process is performed on the image data of the three-dimensional image on the basis of a ratio between the first optical transfer characteristic and the second optical transfer characteristic.

* * * * *